United States Patent
Naganna et al.

(10) Patent No.: US 11,615,064 B2
(45) Date of Patent: Mar. 28, 2023

(54) DATA MANAGEMENT CONFIGURATION TUNING THROUGH LINK PREFERENCE DETECTION

(71) Applicant: International Business Machines Corporation, Armonk, NY (US)

(72) Inventors: Soma Shekar Naganna, Bangalore (IN); James Albert O'Neill, Jr., Austin, TX (US); Geetha Sravanthi Pulipaty, Bangalore (IN); Abhishek Seth, Deoband (IN); Neeraj Ramkrishna Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 17/246,767

(22) Filed: May 3, 2021

(65) Prior Publication Data
US 2022/0350782 A1 Nov. 3, 2022

(51) Int. Cl.
G06F 16/21 (2019.01)
G06F 16/25 (2019.01)
G06F 16/2457 (2019.01)
G06N 20/00 (2019.01)
G06F 16/22 (2019.01)
H04L 67/50 (2022.01)

(52) U.S. Cl.
CPC ........ *G06F 16/217* (2019.01); *G06F 16/2237* (2019.01); *G06F 16/24578* (2019.01); *G06F 16/256* (2019.01); *G06N 20/00* (2019.01); *H04L 67/535* (2022.05)

(58) Field of Classification Search
CPC .......................... G06F 16/217; G06F 16/2237
See application file for complete search history.

(56) References Cited

U.S. PATENT DOCUMENTS

| | | | |
|---|---|---|---|
| 9,953,279 B1 * | 4/2018 | Hankins | G06Q 10/06 |
| 2016/0112394 A1 | 4/2016 | Sahu | |
| 2017/0262460 A1 * | 9/2017 | Nordstrom | G06F 11/3495 |
| 2020/0134483 A1 | 4/2020 | Bremer | |
| 2020/0320153 A1 | 10/2020 | Luz Xavier Da Costa | |
| 2021/0019392 A1 * | 1/2021 | Chaganti | H04L 63/0807 |
| 2021/0042277 A1 * | 2/2021 | Sloane | G06F 16/213 |
| 2021/0374525 A1 * | 12/2021 | Bremer | G06K 9/6272 |
| 2022/0083363 A1 * | 3/2022 | Lewis | G06F 9/45533 |

OTHER PUBLICATIONS

"Predictive Error Detection of MDM Task Stewardship using ML", An IP.com Prior Art Database Technical Disclosure, Authors et al.: Disclosed Anonymously, IP.com No. IPCOM000262515D, IP.com Electronic Publication Date: Jun. 9, 2020, 3 pages.
Mell et al., "The NIST Definition of Cloud Computing", National Institute of Standards and Technology, U.S. Department of Commerce, NIST Special Publication 800-145, Sep. 2011, 7 pages.

* cited by examiner

*Primary Examiner* — Jaya Morrison
(74) *Attorney, Agent, or Firm* — David K. Mattheis

(57) ABSTRACT

Configuring a data management system by receiving user interaction data associated with search results associated with a first system configuration, identifying a usage pattern in the user interaction data using a first machine learning model, and altering the first system configuration according to the usage pattern.

20 Claims, 4 Drawing Sheets

DATA MANAGEMENT CONFIGURATION TUNING THROUGH LINK PREFERENCE DETECTION

FIELD OF THE INVENTION

The disclosure relates generally to the automatic configuration of a data management system. The disclosure relates particularly to automatically configuring a data management system using detected link preferences.

BACKGROUND

Data Management based solutions work with enterprise data, perform indexing, matching and linking of data from different sources creating a 360 view of customer data.

Matching record pair data requires comparing different record attributes (e.g. Name, Address, DOB, Identifier) from each pair of records to determine if they match and should subsequently be linked, based on a series of mathematically derived statistical probabilities and complex weight tables.

Attribute comparison functions check for a variety of matching conditions like exact, edit distance, NGRAM, phonetic, or partial matching. The method generates matching scores based on the outcome of these comparisons, and sub scores from each attribute are combined based on statistically determined relative weights. Using statistically defined thresholds within the system, methods consider pairs of records as matched, unmatched, or indeterminant and sent to manual review.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable automatically configuring a data management system.

Aspects of the invention disclose methods, systems and computer readable media associated with configuring a data management system by providing search results according to a first system configuration, receiving user interaction data associated with the search results, identifying a usage pattern in the user interaction data using a first machine learning model, and altering the first system configuration according to the usage pattern.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
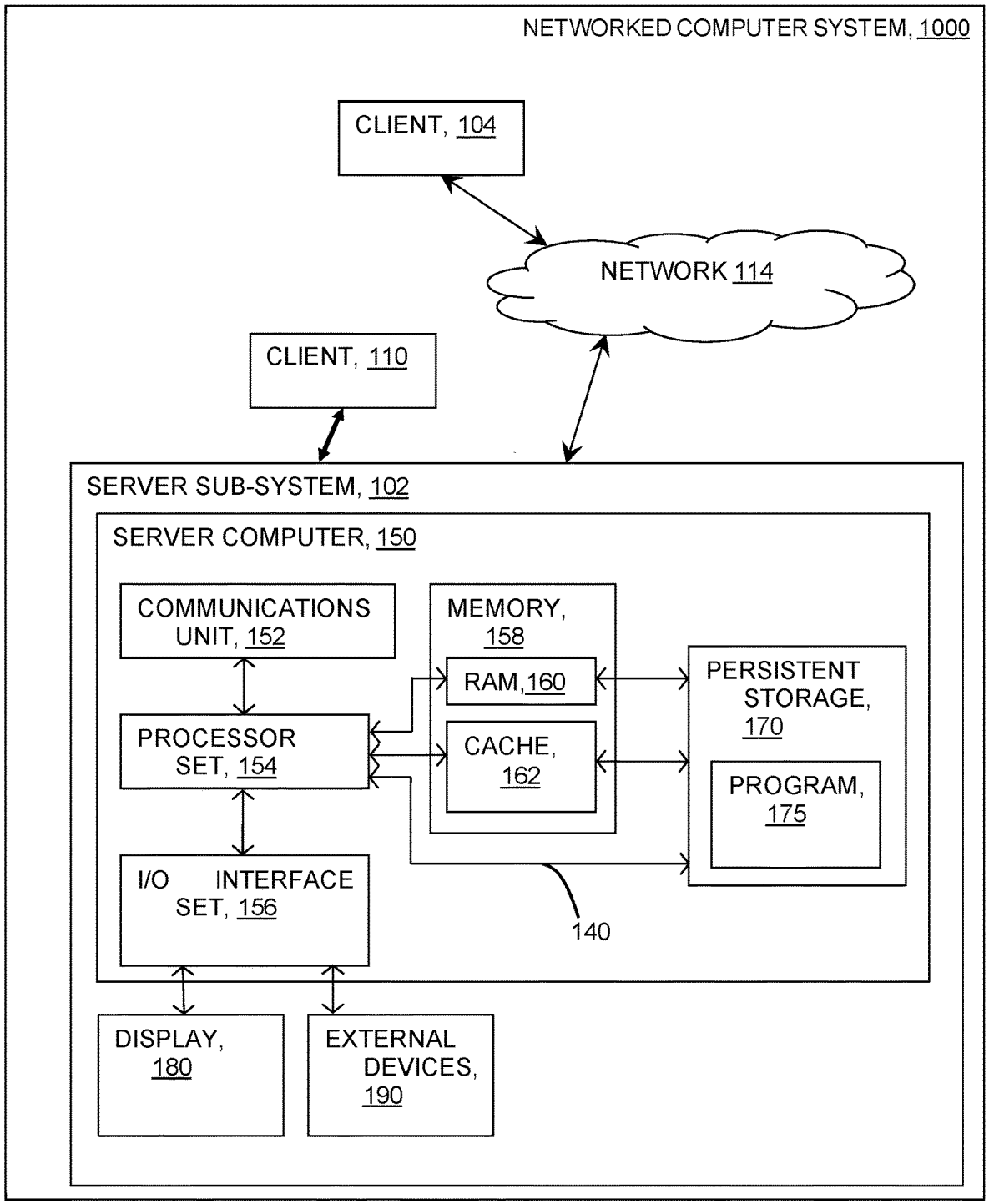
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Unsupervised data management matching engines driven by complex algorithms trained through sophisticated statistical processes evaluate likely "matched" and "random" pairs of records selected during bulk analytic processes. These methods yield highly accurate results. Achieving hyper-accurate results often requires supervised learning to further tune/refine the algorithms. This supervised learning can be tedious and time consuming, often requiring a user to work through dozens or hundreds of sample pairs to further refine the user's linking preference(s). "Pair analysis" may be used to detect linking preferences for algorithm tuning.

The bootstrap algorithm creation/generation can be done automatically (using some smart ways of constructing various components of algorithm based on supplied data) or it can be hand-coded by domain experts. Disclosed embodiments enable the automatic detection of user linking preferences for algorithm configuration tuning.

In an embodiment, a method determines the unique customer or user "preference" for a specific attribute pattern based on the user's interactions with data through other user interfaces. Methods use passive learning done in the background on common user tasks that are not typically used for ML training. Examples include: Monitoring which search results are clicked on when a user is presented with a scored list of results sorted by strength of match; Monitoring for repeating patterns of "no results" searches, indicating a missed business process use case that values specific combinations of search attributes that were not indexed together, such as a phone number only search which returns no results while a name plus phone is indexed and returns results.

User interaction data may contain patterns where a primary search by name yields a result that is clicked on. A subsequent search for a phone number yields a secondary record that shares the same phone and address. This pattern is repeated. The customer may benefit from implementing a household algorithm that was not previously implemented.

Analyzing user interaction data for these search patterns and user interactions can lead to the creation or alteration of indexes, the modification of attribute score weights and how they contribute to overall scoring patterns, the modification of thresholds, and the addition of algorithm types. Thresholds refer to the break points between scores indicating records should be linked and scores indicating records should not be linked.

Aspects of the invention provide an improvement in the technical field of data management systems. Conventional data management systems utilize static (i.e., unchanging) search and matching algorithms when deciding which records to return in response to a system query by a user. In many cases, users must submit a series of queries, modifying an original query in response to received results, to arrive at desired search results. As a result, the system uses more resources and takes more time for the user to achieve their intended search outcome. Implementations of the invention analyze previous user interactions across a large set of system users. The analysis provides indications of system configuration alterations which may improve the users experience and reduce the computational resources and user time necessary to achieve a desired search result.

Aspects of the invention also provide an improvement to computer functionality. In particular, implementations of the invention are directed to a specific improvement to the way data management systems are configured. Disclosed embodiments analyze historic user interaction data associated with system results returned in response to user queries. The embodiments determine configuration changes yielding fewer "no result found" system responses as well as reducing the user effort and number of user queries necessary to acquire usable or desired query results.

In an embodiment, one or more components of the system can employ hardware and/or software to solve problems that are highly technical in nature (e.g., providing search results according to a first system configuration, receiving user interaction data associated with the search results, identifying a usage pattern in the user interaction data using a first machine learning model, altering the first system configuration according to the usage pattern, etc.). These solutions are not abstract and cannot be performed as a set of mental acts by a human due to the processing capabilities needed to facilitate the automatic configuration of data management systems, for example. Further, some of the processes performed may be performed by a specialized computer for carrying out defined tasks related to data management system configuration tuning. For example, a specialized computer can be employed to carry out tasks related to tuning data management algorithm configurations.

In an embodiment, a data management system provides search results in response to user queries. The search results may include results ranked using user preferences. The results include records matched using the then current configuration of the data management system. The matching algorithms of the system include matching weights associated with record attributes as well as matching thresholds for determining whether two records match, are unmatched, or if a match cannot be determined without manual intervention.

Users interact with the provided search results, selecting records of interest and conducting additional searches when the results fail to include what everything for which the user is searching. In this embodiment, the method tracks the interaction of users to the provided search results, including record selection and subsequent search queries posed after the provision of the initial and subsequent sets of search results. The method compiles and stores records of user interactions across a set of some or all users of the search results. Compiling interaction data across a plurality of users reduces any bias in the data associated with a single user of the results. The method translates user interaction data into behavior vectors including the attributes of the user interaction, e.g., what records are selected, the underlying attributes of the selected records, queries made subsequent to record selections, "no search results" responses to user queries and subsequent queries made to return results after an initial return of no results, etc.

In an embodiment, the method processes the user interaction data using a trained machine learning model. The model analyzes the interaction data vectors and clusters the vectors according to the similarity between different vectors. In this embodiment, the method determines a Jacquard coefficient, Cosine distance, Euclidean distance, Relaxed Word Mover's Distance, and may utilize term frequency-inverse document frequency (tf-idf) techniques. A person of ordinary skill in the art may apply other techniques of determining similarity between user interaction data vectors associated with the interaction of user's with provided search results.

In an embodiment, the analysis of the interaction data yields one or more clusters of vectors, representing one or more user interaction patterns. Identified patterns include attributes common to some or all records clicked upon by users after an initial search. As an example, all records clicked upon after an initial query returns a set of ranked results share one or more record attributes, name, phone number, date of birth, etc., but not all the records share an address, or a completely matched address. In an embodiment, the method interprets such a pattern of interaction as indicating that the address is not as significant as other record attributes and an indication that the weight assigned to address in selecting matching records should be reduced. As another example, all clicked records generally having a common passport number suggests justification for a higher weight for that identifier field. In this embodiment, the method generates suggested configuration alterations adjusting the matching algorithm weights for address and/or passport number.

In an embodiment, the analysis of the interaction data indicates a pattern of interaction including an initial search returning "no search results", followed by an enhanced search which does return results. For example, a search for a single initial criterion yields no results. The user enhances the search with additional search attributes and the new query return results of interest to the user. In this example, analysis of the interaction data across a set of users finds the same pattern of no results for the attributes of an initial search, and then results of interest in response to the enhanced query. Such a pattern indicates that records of interest for the initial search were present in the data set but that the initial criterion was insufficient for the data management system to match the records of interest.

In such circumstances, a search index for the attribute(s) of the initial failed searches may yield the results of interest to the users using only the initial search criterion. As an example, for a system without a search index for phone number, but including a search index for name, plus phone number, an initial search for a phone number returns no results, but the enhanced search for name plus phone number returns records of interest. Repeated user interactions having initial "no results" searches for phone number, followed by enhanced searches for name plus phone number, indicate a need for a search index by phone number alone. In an embodiment, the method generates an altered configuration suggestion for the data management system including a search index for the attribute phone number, or analogous records attributes depending upon the details of the interaction data.

In an embodiment, the method ignores interaction data indicating an initial "no search results" followed by enhanced queries which also fail to return any search results in determining the need for additional search indices.

As an example, an initial name search returns a record of interest which the user selects. A subsequent search for a phone number yields a secondary record sharing the same phone number and address as the record of interest from the name search. Over the set of users, this pattern repeats indicating a potential benefit from the implementation of a household search algorithm providing results linked across phone numbers and addresses. The method generates an altered configuration suggestion for the data management system including the household algorithm to the system's search and/or matching algorithm configurations.

In an embodiment, analysis of interaction data reveals patterns of search transactions having successful search results in response to series of queries. For example, users execute multiple queries, clicking some records of interest from the results of each of the multitude of queries. Analysis of the common attributes of the records selected across the set of queries reveals a set of record attributes common to all records selected across the set of queries. For this example, the method defines a new search entity type, spanning the set of common attributes of the selected records. The method generates a suggested altered configuration for the data management system, adding the new entity type and enabling users to more efficiently search for the records of interest using the new entity type.

In an embodiment, after identifying usage patterns across a sufficient number of user interactions, the method generates a new algorithm version, having adjusted weights, thresholds, new entities, etc., and proposes the alterations to a user or administrator for approval. A sufficient number refers to a statistically significant number of user interactions. In an embodiment, a sufficient number relates to several hundred user interactions. Subject to the approval, the method updates the current system configuration to include the alterations to the configuration. In an embodiment, updating the configuration results in new search results from current queries based upon the use of the altered configuration algorithm weights, thresholds and new entities etc.

Current algorithm refinements result from manual pair analysis with a single user or small set of users laboriously reviewing and providing feedback on matched pairs identified by the data management algorithms. Such feedback may be used to refine the matching weights and matching thresholds of the algorithm. The refinement comes at the risk of introducing an individual bias from the use of feedback from a single user of small set of users to refine the algorithm. Disclosed embodiments enable the collection of interaction data from across the entire set of system users and the identification of usage patterns from across that entire set of users. Such a broad scope of input interaction data reduces the likelihood of an algorithm shifting in response to bias of a single individual or small group of individuals.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise data management configuration tuning program (not shown) together with sufficient computing resource (processor, memory, network communications hardware) to execute the program. Client devices 104 and 110 may provide search results to users and user interaction data to the server subsystem 102, as part of automatically configuring the data management system algorithms to improve system performance. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the data management system configuration program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., data management system configuration program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
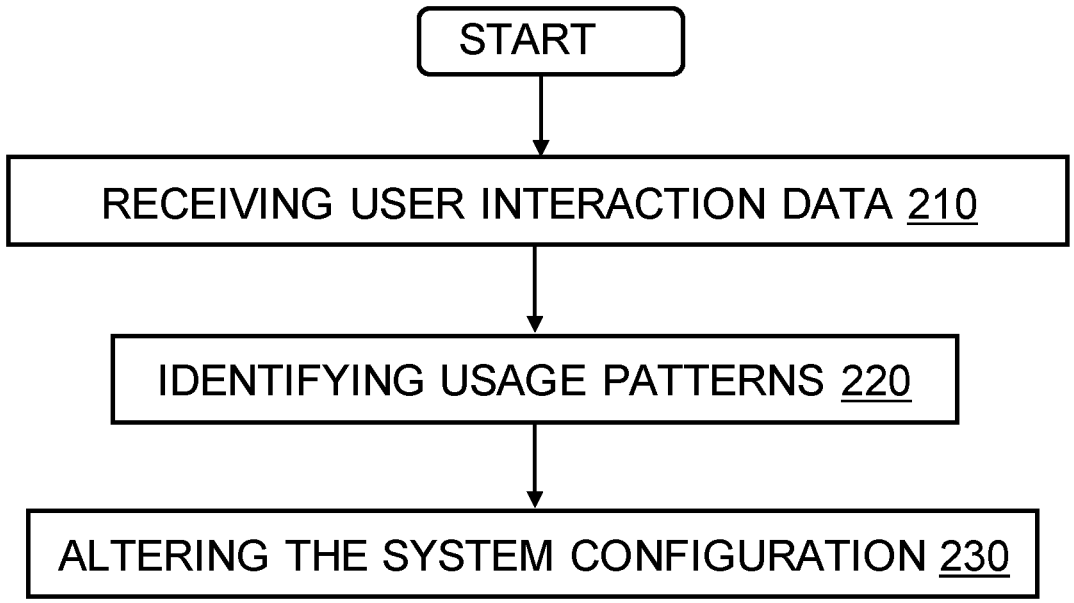
FIG. 2 provides a flowchart depicting an operational sequence, according to an embodiment of the invention.

FIG. 2 provides a flowchart 200, illustrating exemplary activities associated with the practice of the disclosure. After program start, at block 210, methods executing the data management system configuration program 175, using the system of FIG. 1, receive user interaction data associated with search results for the user's search queries. The associated data management system includes a system configuration of search algorithms and matching algorithms, including matching thresholds and weights for the respective attributes of data records. User's receive the search algorithm results and interact with the results, selecting records of interest and/or submitting subsequent search queries for additional records of interest.

At block 220, the method analyzes the user interaction data to identify patterns of user interactions associated with the provided search results. The method generates vector representations of the user interactions where the vectors include attributes of searches, selected records, subsequent searches, etc. In an embodiment, the method utilizes a trained machine learning model to determine vector similarities according to a distance between vectors, and to cluster vectors according to the determined distances between vectors. In this embodiment, the method prioritizes larger cluster over smaller clusters. The method generates potential system configuration changes associated with identified clusters. Changes include altering search and/or matching algorithm weights, altering matching algorithm thresholds, defining new entities, etc. In an embodiment, the method generates suggested alterations to modify search or matching algorithm weights, to add or remove attribute indices, to add new search or matching algorithms for new combinations of attributes, etc.

At block 230, the method proposes the configuration changes to a user or system administrator. In an embodiment, the method receives approval for the proposed configuration changes from the user. After receiving approval, the method alters the configuration according to the approved changes. Altering the configuration may further include triggering new searches using the new configuration and providing the new search results to users.

The disclosed data management system automatic configuration methods may include large volumes of search results and user interaction data sets such that local computing environments cannot provide timely analysis suggested configuration alterations to improve system performance. Such methods may utilize edge cloud and cloud resources to enable timely usage pattern analysis and the suggestion and implementation of configuration alterations to improve the performance of the target systems.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
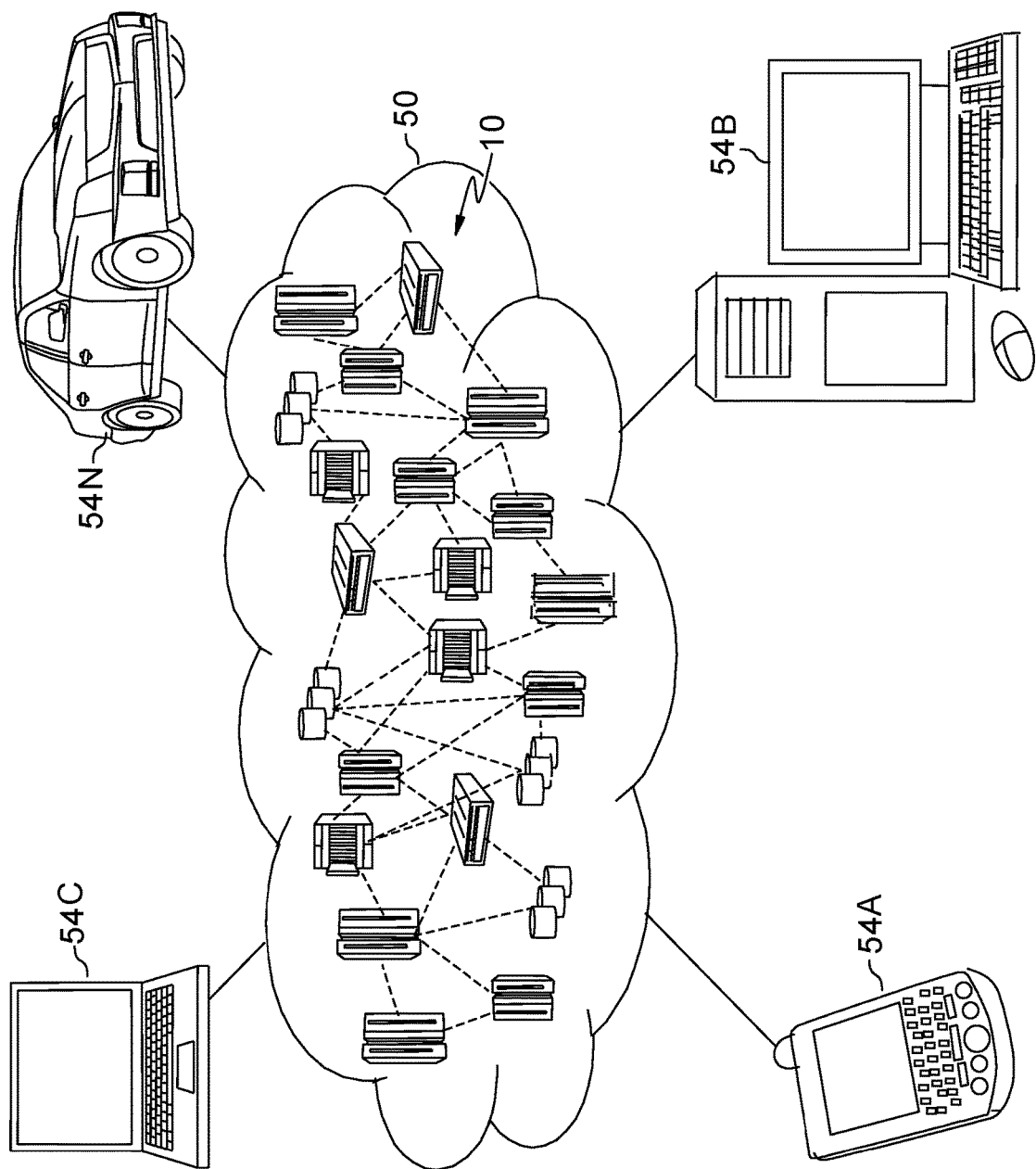
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
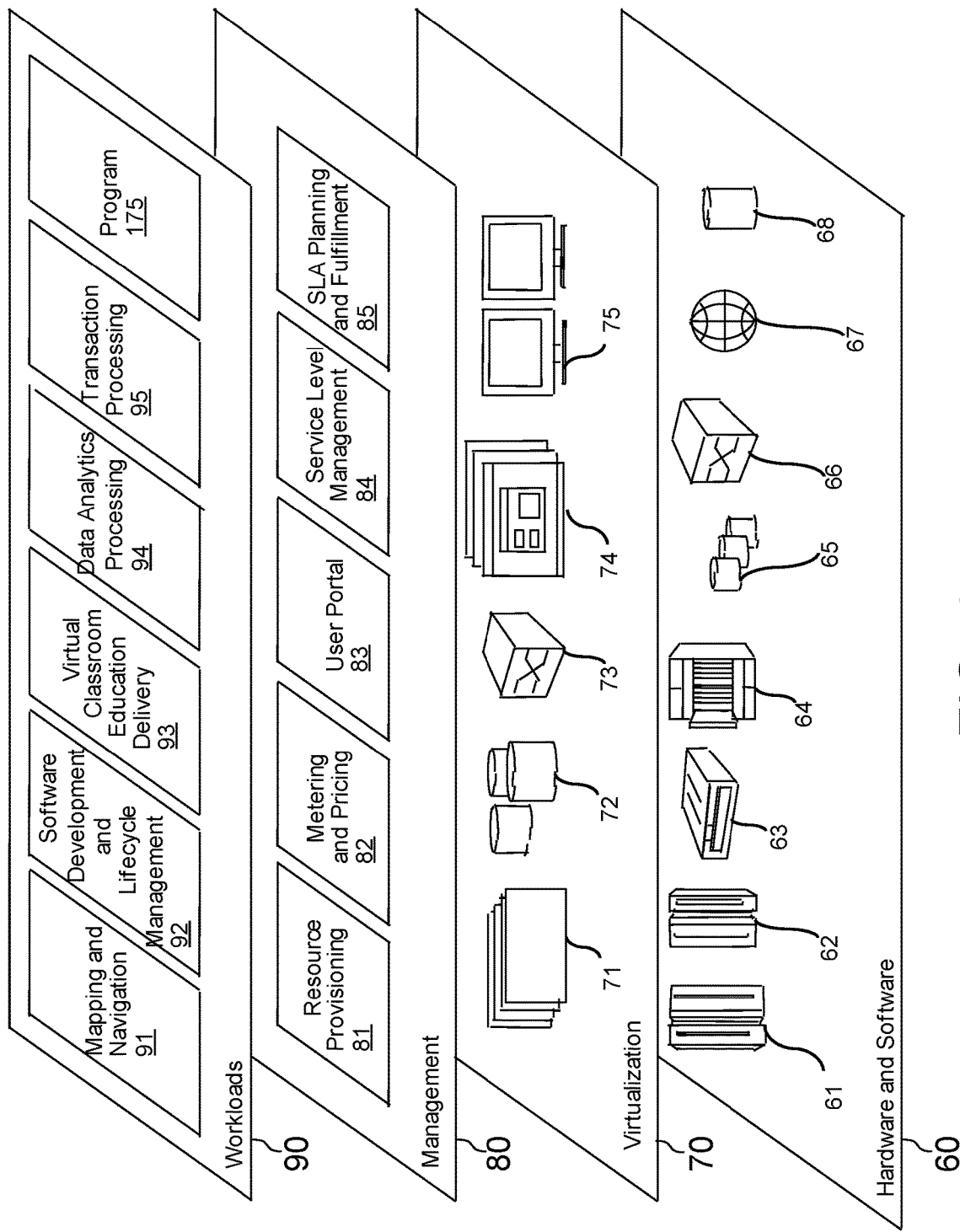
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data management system configuration program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for configuring a data management system, the method including:
   receiving, by one or more computer processors, user interaction data associated with matched record search results associated with a first system configuration;
   identifying, by the one or more computer processors, a usage pattern in the user interaction data using a first machine learning model; and
   altering, by the one or more computer processors, the first system configuration according to the usage pattern, wherein altering includes an action selected from a group consisting of: adding a new matching algorithm to the first configuration, and adjusting a matching algorithm threshold of the first configuration.

2. The computer implemented method according to claim 1, wherein altering the first system configuration comprises altering a weight for an attribute.

3. The computer implemented method according to claim 1, wherein altering the first system configuration comprises generating a search index for an attribute.

4. The computer implemented method according to claim 1, wherein altering the first system configuration comprises creating a new search entity.

5. The computer implemented method according to claim 1, wherein the user interaction data comprises data from interaction of a plurality of users.

6. The computer implemented method according to claim 1, wherein the user interaction data comprises user selections from provided search results.

7. The computer implemented method according to claim 1, wherein identifying usage patterns comprises clustering user interaction data vectors.

8. A computer program product for configuring a data management system, the computer program product comprising one or more computer readable storage devices and collectively stored program instructions on the one or more computer readable storage devices, the stored program instructions comprising:
program instructions to receive user interaction data associated with matched record search results associated with a first system configuration;
program instructions to identify a usage pattern in the user interaction data using a first machine learning model; and
program instructions to alter the first system configuration according to the usage pattern, wherein altering includes an action selected from a group consisting of: adding a new matching algorithm to the first configuration, and adjusting a matching algorithm threshold of the first configuration.

9. The computer program product according to claim 8, wherein altering the first system configuration comprises altering a weight for an attribute.

10. The computer program product according to claim 8, wherein altering the first system configuration comprises generating a search index for an attribute.

11. The computer program product according to claim 8, wherein altering the first system configuration comprises creating a new search entity.

12. The computer program product according to claim 8, wherein the user interaction data comprises data from interaction of a plurality of users.

13. The computer program product according to claim 8, wherein the user interaction data comprises user selections from provided search results.

14. The computer program product according to claim 8, wherein identifying usage patterns comprises clustering user interaction data vectors.

15. A computer system for configuring a data management system, the computer system comprising:
one or more computer processors;
one or more computer readable storage devices; and
stored program instructions on the one or more computer readable storage devices for execution by the one or more computer processors, the stored program instructions comprising:
program instructions to receive user interaction data associated with matched record search results associated with a first system configuration;
program instructions to identify a usage pattern in the user interaction data using a first machine learning model; and
program instructions to alter the first system configuration according to the usage pattern, wherein altering includes an action selected from a group consisting of: adding a new matching algorithm to the first configuration, and adjusting a matching algorithm threshold of the first configuration.

16. The computer system according to claim 15, wherein altering the first system configuration comprises altering a weight for an attribute.

17. The computer system according to claim 15, wherein altering the first system configuration comprises generating a search index for an attribute.

18. The computer system according to claim 15, wherein altering the first system configuration comprises creating a new search entity.

19. The computer system according to claim 15, wherein the user interaction data comprises data from interaction of a plurality of users.

20. The computer system according to claim 15, wherein identifying usage patterns comprises clustering user interaction data vectors.

* * * * *